United States Patent Office 3,499,955
Patented Mar. 10, 1970

3,499,955
REINFORCED MOLDABLE COMPOSITION AND
PROCESS OF PRODUCING THE SAME
Richard F. Shannon, Lancaster, Ohio, assignor to Owens-Corning Fiberglas Corporation, a corporation of Delaware
No Drawing. Continuation-in-part of application Ser. No. 544,825, Nov. 3, 1955. This application Dec. 9, 1963, Ser. No. 329,312
Int. Cl. B28b 21/14, 1/08
U.S. Cl. 264—102
9 Claims

ABSTRACT OF THE DISCLOSURE

A method of producing a body reinforced by glass in both fibrous and flake or platelet form and which is substantially free of entrapped vapors. The method includes the steps of admixing a binder and glass flakes and glass fiber reinforcement in a predetermined ratio, treating the mixture to remove entrapped vapors, and thereafter curing the binder to produce the reinforced body. Also covered is the reinforced body made by the process described.

REFERENCE TO RELATED APPLICATION

This is a continuation-in-part of application Ser. No. 544,825, filed Nov. 3, 1955, now abandoned.

This invention relates to a reinforced moldable composition and the process of producing the same, and more particularly, to such a composition which includes a bonding material and glass both in fibrous form and in flake or platelet form and which is substantially free of entrapped vapors.

Bodies reinforced with glass in fibrous form, or with glass in flake or platelet form, and bonded by various resins or other materials have been produced prior to this invention.

Fibrous glass is well known as an excellent reinforcing material for use in various binders to form molded articles or bodies. The physical properties of such articles, such as flexural strength and modulus and impact strength, are substantially increased as compared with an unreinforced body that is otherwise identical. The presence of fibrous glass in a molded body has little or no effect, however, on the electrical characteristics, flame resistance, vapor and liquid impermeability, and weathering properties of the body. Such bodies having fiberglass reinforcing are in fact poor insulators.

It is also known to the art that articles composed of a suitable binder reinforced by glass flakes alone have excellent characteristics for use as electrical insulators. Such articles, in addition to having excellent electrical insulating characteristics, also have excellent weathering properties, vapor and liquid impermeability, and flame resistance. Due to the presence of the glass flakes, an electrical discharge or liquid or vapor, in order to penetrate the article, must find its way around each flake imbedded in the material, thus making to total distance for passage through the article substantially greater than the thickness of the article itself.

While glass flakes reinforced materials theoretically may have physical properties approaching those of glass fiber reinforced materials, a practical difficulty in manufacturing glass flake materials is due to the tendency of the glass flakes to adsorb small amounts of vapor (particularly air) upon their surfaces and to thus prevent the binder from thoroughly wetting the flake and from adhering thereto.

Heretofore, many efforts and attempts have been made to produce a glass flake reinforced composition wherein the flake surfaces are substantially free of entrapped vapors so that they can be thoroughly wetted and adhered to by the binder. Improved results have been attained by various methods of removing the vapors from the molding composition such as agitating the mixture of the binder and flakes in a partial vacuum as will be described below.

Improved results have also been obtained by providing glass flakes with fresh or nascent surfaces by introducing the flakes into the binder shortly after their formation so that the nascent surfaces have not had time to adsorb an appreciable amount of air. Improved results have also been obtained by chemically treating the glass flakes prior to their use in the binder as is also described below.

Even when the glass flakes used in a binder are treated chemically or have freshly prepared surfaces and the binder mixture is subjected to a partial vacuum, the resulting composition is not entirely satisfactory due to small amounts of entrapped vapors which remain on the flakelet surfaces and prevent the thorough wetting of the flakes by binder. Due to the fact that a substantial number of flakelets within the mixture are in face to face contact, a small amount of vapor becomes entrapped between such flakes and cannot be removed when the mixture is agitated under a partial vacuum or otherwise treated to remove entrapped vapors. Thus, the opposed faces of the flakes are not wetted by the binder and are loosely adhered to each other. When a substantial number of these non-wetted, non-adhering flakelets are present in an article, its structural strength is greatly impaired. If a number of such non-adhering flakes are disposed in a single plane within an article, the article will be substantially weakened and subject to fracture or cleavage along this plane.

The instant invention is based upon the discovery that bodies reinforced with glass *both* in fibrous and in flake or platelet form can be produced, and that such bodies have electrical characteristics, weathering properties, vapor and liquid impermeability, and flame resistance by virtue of the presence of the flake or platelet glass, and also superior physical properties by virtue of the presence of a small amount of fibrous glass which serves to prevent the glass flakes from adhering to one another and thus allows removal of the entrapped vapors, allowing complete wetting of the glass flakes by the binder.

It is, therefore, an object of the invention to provide a body reinforced by glass in both fibrous and flake or platelet form which is substantially free of entrapped vapors.

It is a further object to provide a glass reinforced body having superior physical properties, and, in addition, flame resistance, electrical characteristics, vapor and liquid impermeability, and weathering properties substantially better than previously known similar materials.

It is still another object of the invention to provide a moldable material including a binder, fibrous glass and flake glass which is substantially free of entrapped vapors.

It is yet another object to provide a process for producing a moldable material comprising a binder, fibrous glass, and flake glass which is substantially free of entrapped air.

Other objects and advantages will be apparent from the description which follows, which is intended only to illustrate and disclose but in no way to limit the invention.

According to the invention, an improved reinforced body comprising fibrous glass reinforcement, flake glass reinforcement, and a binder, which is substantially free of entrapped air, is provided.

It has been found that at least 1 per cent of the glass reinforcement should be in fibrous form and preferably at least 5 percent to prevent adherence of a substantial number of flakes as explained above.

Film or flake glass can be produced as illustrated, for example, in Slayter et al. Patent No. 2,457,785. This patent discloses an apparatus in which molten glass is flowed through an annular orifice in the bottom of a glass supply device so that a tubular structure of thin glass is formed as the glass cools. As the tube begins to solidify, but while it still remains plastic, it is flattened and gripped between the peripheries of a pair of rollers which are rotated at a substantial speed to feed the flattened tube downwardly. This longitudinal movement attentuates the sheet of glass after it leaves the orifice, and, under proper control as to temperatures, etc., a flattened tube of glass is produced. The double ribbon or flattened tube of glass can be led away and shattered to produce flakes or platelets of glass or it may be retained as a film, if desired. By proper control over the conditions of operation, it has been found that these flakes or platelets may be kept substantially flat or may be curled, corrugated or crinkled. The film can be produced with a high degree of control as to its thickness; as little, for example, as 2½ microns or less to substantially thicker, if desired, for example, 0.006 to 0.010 inch. Inward collapse of the tube, and thus surface contact between the walls thereof, can be prevented by pumping gas or vapor into the interior of the tube in any suitable manner.

The glass flakes may be treated by suitable materials in order to give them "fresh surface" characteristics. Such materials can be coupling agents or surface protective coatings, as hereinafter discussed in more detail, or can be substances that are identical, compatible or reactive with the binder with which the flakes or platelets are to be associated as a reinforcing material in a final body according to the invention.

At least 50 percent of the glass should be in flake or platelet form in order to achieve the desired weathering and electrical properties, flame resistance, and the like. The terms "percent" and "parts" are used herein and in the appended claims to refer to percent and parts by weight, unless otherwise indicated. The total amount of glass reinforcement in a body according to the invention should be at least 30 percent of the body, and may be as much as 90 percent. It is usually preferred that the glass be from 50 to 80 percent of the body, most desirably from 60 to 80 percent. Conversely, the binder should constitute from 10 percent to 70 percent of the body, preferably from 20 percent to 50 percent thereof, and, most desirably, from 20 percent to 40 percent.

A reinforced body according to the invention contains, in addition to fibrous glass and flake glass, any suitable binder. Such binder can be organic or inorganic, naturally occurring or synthetic. Synthetic resinous materials are generally excellent binders because of the ease with which bodies of any desired ultimate shape can be formed by lamination, casting or by compression, injection or transfer molding. The synthetic resinous materials can be ones which are converted to a hardened condition either by condensation, which involves the evolution of a vaporous by-product, usually water, or by addition polymerization or an equivalent mechanism without the evolution of any by-product. Examples of materials of and former type include pheno-aldehyde, urea-aldehyde, melamine-aldehyde, and dicyandiamide-aldhyde resins. All of these materials form water of condensation during curing. The presence of the fiberglass or other fibrous material in molding compositions of this type is particularly important to facilitate the removal of evolved vapors. Materials of the latter type which cure by addition polymerization or an equivalent mechanism include polyesters, epoxies and urethanes.

Naturally occurring binders, usually organic drying oils, can also be employed, as well as such inorganic binders as silicates, such as metal silicates and colloidal silicas, cementitious materials such as Portland cements, magnesium-oxysulfate cements and magnesium oxychloride cements, calcium sulphate hemi-hydrate, calcium aluminate, and even various metals. In addition, rubbery binders such as natural or synthetic rubber, elastomeric urethane, etc. may be used.

As is indicated above, glass flakes or platelets may advantageously be treated in any of several ways prior to use as reinforcing material. It is known that air and other vapors from the atmosphere are adsorbed on glass surfaces and such adsorption begins as soon as a glass surface is exposed to an atmosphere. The adsorption proceeds toward an equilibrium condition at which molecules of gas from the adsorbed layer pass into the atmosphere at the same rate that different molecules from the atmosphere pass into the adsorbed layer. The extent of the adsorbed layer at equilibrium will change in response, for example, to a change in the composition or temperature of the surrounding atmosphere. When a glass surface is formed from a melt, for example, by extruding a body of glass through an orifice, and forming a tube therefrom, as above described, there is an infinitesimal period of time at which there are no adsorbed gases on such surface. Adsorption proceeds, however, even on a hot glass surface, at a substantial rate. As a result, even as little as a second after a glass surface is formed, there is a small layer of adsorbed gases associated therewith. As such surface cools, the adsorbed layer of gases is increased in thickness until the point of equilibrium is reached.

It has been observed experimentally that freshly prepared glass flakes or platelets of any given composition adhere better to various binders than flakes or platelets of identical composition that had been allowed to stand for an appreciable period of time. It has also been observed, particularly in producing translucent or transparent bodies containing glass flakes, that gas bubbles frequently are present at the glass surfaces. The presence of such gas bubbles reduces the area of contact between the glass and the resin, and, therefore, the degree of adhesion between the two. When optimum adherence is desired between glass flakes or platelets and the binder in a reinforced body according to the invention, nasent or fresh surface should be provided on the flakes or platelets.

In general, bonding to a nascent or fresh surface can be accomplished by (1) applying the binder to the surface immediately after formation thereof, (2) by restoring the nascent condition of an aged or weathered surface, or by (3) preventing or minimizing the deleterious effect of adsorbed gases until the binder is applied.

As an example of the first technique, flakes can be incorporated in a binder composition, and mechanically agitated to cause fracture. Even though the nascent surfaces formed by fracture in such manner are usually of the order of only a few microns in thickness and, therefore, constitute only a minor portion of the entire surface of a flake, measurably improved adhesion can be achieved in this manner. Instead of being collected for subsequent use, the double ribbon of film glass produced as described above can be introduced directly after formation into a binder which is agitated in any suitable manner or which is otherwise treated to cause fracturing of the ribbon. This technique takes advantage of the new or nascent surfaces on the ribbon immediately after formation and immediately after fracture. Similarly, the ribbon can be introduced into a composition which it is not desired to reinforce, but which is, rather, a starting material used in the production of such compositions, for example phenol, formaldehyde, a glycol or other material that can be reacted chemically with another material to produce a binder, or into a material that is a solvent for the binder ultimately to be used, for example acetone, xylene, toluene, or the like.

As an example of the second technique, an aged or weathered surface can also be restored to a fresh condition, for example, by a treatment with aluminum chloride, hydrogen chloride, silicon tetrachloride or other dehydrating agent, even ammonium chloride being somewhat effective. Further, such a surface can be etched or leached away, exposing a fresh or nascent surface.

As an example of the third technique, adhesion between glass flakes and various binders can also be improved by applying a treating agent to the surfaces of a flake while still fresh, or by applying a coupling agent to the surfaces at any time. As a specific example, a silane or silane derivative can be applied to one or more of the surfaces of the double ribbon discussed above. The silane or silane derivative, which can be a silicone, a siloxanol or a silicone salt, can be sprayed onto interior or exterior glass surfaces, or both. Werner's complex materials, for example methacrylato chromic chloride, and organo boron compounds such as methyl-, ethyl-, isoamyl-, isobutyl-, phenyl-, propyl-, and tolyl-boric acids, as well as other similar materials, in either liquid or vapor form, can be so applied to glass surfaces. In general, a material to be useful for such purpose should be one which forms a bond, for example of the Si-O-Si type, the Cr-O-Si type, the B-O-Si type, or a similar strong bond, with glass, and one having a molecular structure that includes some kind of a hydrophobic radical. Such a material is herein designated a "treating agent," and can be used to preserve the fresh or "nascent" surfaces of glass flakes or platelets. A treating agent having a molecular structure that includes, in addition, a portion that is either compatible or reactive with a specific binder used to produce a reinforced body according to the invention is herein designated a "coupling agent." As specific examples of materials that can be used as treating- or coupling-agents, the following are worthy of mention: Phenyl silanes and silane derivatives, vinyl silanes and derivatives, specifically vinyl trichlorosilane or the hydrolysis products thereof, methacrylato chromic chloride, polyisobutylene, gelatin, blood albumin, casein, amine resins, ethyl vinyl silicate, formaldehyde, allyl silicate, methallyl silicate, ethallyl silicate, allyl silanes, methyl-, ethylallyl silanes, methallyl silanes, ethallyl silanes and amino silanes. Formaldehyde, when used, is preferably an after treatment following a processing of the flakes with gelatin, blood albumin, casein, an amine resin or a silicate. In all the above instances, where silanes have been mentioned specifically as treating or coupling agents, siloxanes or siloxanols are advantageously employed under most circumstances because of ease of handling.

As previously pointed out, even if the glass flakes are freshly prepared and have been treated by one of the various techniques disclosed above, it is desirable to remove any entrapped vapors from the mixture of binder and flakes to assure optimum adherence of the binder to the flakes. While various methods of vapor removal, such as agitation of the mixture under a partial vacuum or rolling the mixture to force out entrapped air, have been partially successful, it has been heretofore impossible to prevent small amounts of entrapped vapors from remaining between the adjacent surfaces of a substantial number of glass flakes within the mixture. As noted previously, these small entrapped vaporous pockets prevent the thorough wetting of the flakes by the binder and therefore cause a substantial decrease in the strength of the glass flake and binder composition.

The inclusion of a small amount of fibrous glass in a glass flake and binder composition causes a remarkable improvement in the strength characteristics of a body composed of such a composition due to the fact that the presence of the fibrous glass makes possible the removal, by vacuum or other means, of substantially all amounts of vapor present in the mixture. It is believed that the glass fibers prevent the adherence of the adjacent surfaces of the glass flakes which heretofore have trapped small amounts of vapors between them. Thus, a surface of one glass flake is prevented from adhering to an adjacent surface of another flake due to the presence of a glass fiber which "wedges" or holds them apart. While the glass flake surfaces are held apart only a small distance, this distance is sufficient to allow any vapors on these adjacent surfaces to escape when the mixture is subjected to vacuum or other vapor removal means. The glass fibers may be used in any convenient form, e.g., strand, roving, monofilament, etc.

The following example is presented to illustrate the method of preparing a molded body of a glass flake reinforced binder containing a small amount of fibrous glass and to show the manner in which the fibrous glass facilitates the removal of entrapped vapors.

Example 1

A mixture consisting of:

35 lbs. of a polyester resin
3½ lbs. of monomeric styrene
5½ grams of cobalt naphthalene
45 grams of vinyl silane
20 lbs. of glass flake with a nominal thickness of 2 microns was placed in a vacuum mixer and agitated for thirty minutes under a vacuum of 25 in. Hg below atmospheric pressure.

A first amount, Mix A, was removed from the mixer and catalyzed with methyl ethyl ketone peroxide. Next, one percent by weight of glass fibers, having an average roving length of ¼ inch, was added to the mix which was further agitated under a vacuum 25 in Hg below atmospheric pressure for another twenty minutes. A second amount, Mix B, was removed and catalyzed in a manner identically the same as Mix A.

Reinforced sheets were made from Mix A and Mix B by spraying said mixes through a ⅛ inch orifice upon an open rectangular mold 6 x 9 inches. The molds were then cured under ambient conditions at 70° F. to form hardened 6 x 9 inch sheets about 60 mils thick. Visual inspection of these sheets disclosed that the sheet made from Mix A, containing no fibrous glass, contained a substantial number of visible air pockets while the sheet made from Mix B, containing 1% by weight of fibrous glass, contained substantially fewer pockets of entrapped air.

A second example is presented to further illustrate the process of producing a reinforced body of this invention and to illustrate the superior electrical properties of a body of this invention.

Example 2

A binder-catalyst mixture consisting of:

100 parts of a polyester resin
2 parts of an organic peroxide solution catalyst
0.5 parts of a vinyl silane agent was mixed at 70° F. for fifteen minutes and then degassed for twenty minutes in a vacuum desiccator.

A molding composition I was prepared from 60 parts of the binder-catalyst mix and 40 parts of chopped spun roving glass fibers having a roving length of about ½ inch. The mix and fibers were blended for fifteen minutes at 100° F. under a vacuum of 27 in Hg below atmosphere.

A molding composition II was prepared from 60 parts of the binder-catalyst mix, 35 parts of glass flake having a nominal thickness of about 1.5 microns, and 5 parts of chopped roving glass fibers having an average roving length of ½ inch. The Composition II was mixed in the identical manner as Composition I.

A molding Composition III was prepared from 60 parts of the binder-catalyst mix, 35 parts of glass powder fine enough to pass through a 100 mesh screen (U.S. Sieve Series), and 5 parts of chopped spun roving glass fibers having an average roving length of about ½ inch. The glass powder and binder-catalyst mix were agitated in a propeller-type mixer for ten minutes, degassed for twenty minutes in a vacuum desiccator, and then mixed with the glass fibers for fifteen minutes at 100° F. under a vacuum of 27 in Hg below atmosphere.

Moldings were produced from Compositions I, II, and III in a similar manner by enclosing the compositions in a plastic envelope under a vacuum of 27 in Hg below atmosphere for five minutes while mechanically working the compositions to remove any entrapped vapors. Sheets were then formed in a 9 x 9 inch mold and cured between flat metal plates in a hydraulic press. The plates were heated to 235° F. and a maximum pressure of 4.5 tons was applied for ten minutes, after which the sheets were post-cured in an oven for four hours.

The electrical properties of the molded sheets were tested under ASTM procedures and are shown in the following table:

| Sheet from Composition No. | Arc resistance (seconds) (average of 5 tests) | Dialectric strength | | | |
|---|---|---|---|---|---|
| | | Breakdown kilovolts | | Volts per mil | |
| | | Wet | Dry | Wet | Dry |
| I (glass fiber only) | 12.8 | 45 | 50 | 523 | 582 |
| II (glass flake and fiber) | 54.6 | 71 | 75 | 877 | 938 |
| III (glass powder and fiber) | 19.0 | 45 | 40 | 499 | 454 |

As may be seen from the table above, the sheet made from Composition II, containing glass flakes with a small amount (5%) of glass fiber, as contemplated by this invention, has remarkably superior electrical properties in comparison to sheets made from Composition I and III.

It is to be appreciated that fibrous materials other than fiberglass may be used in this invention to accomplish the desired separation of adjacent surfaces of the glass flakes to facilitate vapor removal. For example, other vitreous fibers such as those commonly denominated rock wool and mineral wool, and naturally occurring and synthetic fibers such as asbestos, aluminum silicate and pure silica fibers may be used. Such fibers can be characterized generally as siliceous inorganic fibers. Organic fibers can also be used, for example, cellulosic fibers, nylon fibers, saran fibers and the like; however, siliceous inorganic fibers are unexpectedly advantageous by comparison with organic fibers. In retrospect, it is believed that this superiority can be attributed to the non-absorbent nature and high compressive modulus of the siliceous inorganic fibers.

It is to be understood that there are several methods of removing the entrapped vapors from the binder-glass flake-glass fiber mixture contemplated by this invention. Two effective methods of vapor removal, agitation under vacuum and mechanical working or rolling are described in Examples I and II above. Other methods of air or vapor removal may be suitable in practicing the process of this invention depending upon the type of binder used and the type of articles to be molded, etc.

Articles produced according to the instant invention have been found to have excellent electrical and physical properties and are therefore suitable for many uses such as electrical insulators wherein physical strength and vapor impermeability are required. The compositions of this invention may be adapted to numerous other uses where superior electrical and strength characteristics are desirable.

It will be apparent that various changes and modifications can be made from the specific details discussed above and described in the examples without departing from the spirit of the attached claims.

What I claim is:

1. The method of producing a reinforced body substantially free of entrapped vapors comprising the steps of (1) admixing from 10 to 70 parts by weight of a binder selected from the group consisting of organic and inorganic binder materials and from 30 to 90 parts by weight of glass flake and glass fiber reinforcement wherein said glass fiber comprises from 1% to 50% of said glass reinforcement, (2) treating the mixture of binder and glass reinforcement to remove entrapped vapors therefrom by a procedure which includes at least one of the steps of subjecting the mixture to vacuum and rolling the mixture, and (3) shaping said mixture and curing the binder therein to produce said reinforced body.

2. The method of claim 1 wherein the mixture is agitated under a vacuum to remove entrapped vapors.

3. The method of claim 2 wherein the vacuum is from 25 to 27 inches of mercury less than atmospheric pressure.

4. The method of claim 1 wherein the mixture is rolled to remove entrapped vapors.

5. The method of claim 1 wherein the glass fibers constitute less than 10% of said glass reinforcement.

6. The method of claim 1 wherein the binder is a synthetic resin binder.

7. The method of claim 1 wherein the binder is a cementitious binder.

8. The method of producing a reinforced body substantially free of entrapped vapors comprising the steps of (1) admixing from 10 to 70 parts by weight of a binder selected from the group consisting of organic and inorganic binder materials and from 30 to 90 parts by weight of a reinforcing mixture of glass flake and fibrous material selected from the group consisting of organic and siliceous inorganic fibers, wherein said fibrous material comprises from 1 percent to 50 percent of said reinforcing mixture, (2) treating the mixture of binder and glass flake and fibrous material to remove entrapped vapors therefrom by a procedure which includes at least one of the steps of subjecting the mixture to vacuum and rolling the mixture, and (3) shaping said mixture and curing the binder therein to produce a reinforced body.

9. The method of claim 8 wherein the fibrous material consists of siliceous inorganic fibers.

References Cited

UNITED STATES PATENTS

| 2,511,436 | 6/1950 | Kauth | 264—102 |
| 2,780,889 | 2/1957 | Fulk | 260—37 |
| 3,016,598 | 1/1962 | Anderson et al. | 264—102 |
| 3,036,335 | 5/1962 | Hestor et al. | 264—102 |
| 3,153,005 | 10/1964 | Minter | 260—40 |
| 3,230,184 | 1/1966 | Alford | 260—40 |

DONALD J. ARNOLD, Primary Examiner

U.S. Cl. X.R.

106—84, 97, 106, 110; 260—37, 38, 39, 40, 41; 264—69